United States Patent
Brummer

(10) Patent No.: US 9,592,471 B2
(45) Date of Patent: Mar. 14, 2017

(54) RECYCLING METHOD AND DEVICE FOR RECYCLING WASTE WATER CONTAINING SLURRY FROM A SEMI-CONDUCTOR TREATMENT PROCESS, IN PARTICULAR FROM A CHEMICO-MECHANICAL POLISHING PROCESS

(75) Inventor: Franz Brummer, Landshut (DE)

(73) Assignee: HIGHQ-FACTORY GMBH, Klipphausen (DE)

( * ) Notice: Subject to any disclaimer, the term of this patent is extended or adjusted under 35 U.S.C. 154(b) by 0 days.

(21) Appl. No.: 13/500,593

(22) PCT Filed: Oct. 6, 2010

(86) PCT No.: PCT/DE2010/075106
§ 371 (c)(1),
(2), (4) Date: Jun. 25, 2012

(87) PCT Pub. No.: WO2011/042017
PCT Pub. Date: Apr. 14, 2011

(65) Prior Publication Data
US 2012/0261339 A1  Oct. 18, 2012

(30) Foreign Application Priority Data
Oct. 8, 2009  (DE) .................. 10 2009 044 204

(51) Int. Cl.
*B01D 21/34*  (2006.01)
*B01D 61/18*  (2006.01)
(Continued)

(52) U.S. Cl.
CPC ........... *B01D 61/18* (2013.01); *B01D 61/142* (2013.01); *B01D 61/145* (2013.01); *B01D 61/22* (2013.01);
(Continued)

(58) Field of Classification Search
None
See application file for complete search history.

(56) References Cited

U.S. PATENT DOCUMENTS 4,880,547 A * 11/1989 Etani ............................. 210/728
4,915,844 A    4/1990 Imamura et al.
(Continued)

FOREIGN PATENT DOCUMENTS

EP    1 055 446 A2    11/2000
EP    0 979 211 B1     2/2003
(Continued)

OTHER PUBLICATIONS

English Translation of ISR for PCT/DE2010/075106.*
(Continued)

*Primary Examiner* — Allison Fitzsimmons
(74) *Attorney, Agent, or Firm* — Sughrue Mion, PLLC

(57) ABSTRACT

A method for recycling waste water containing slurry from a semiconductor treatment process; including: Filtration in which waste water containing the fresh slurry is continuously introduced into a circulation tank, during which time the mixed waste water is continuously extracted from the circulation tank, the extracted waste water is guided through an ultrafilter device and is concentrated by removing the fluid to form concentrated waste water and the concentrated waste water is introduced into the circulation tank and mixed with the contents of the circulation tank; and concentration in which the addition of fresh waste water to the circulation tank is essentially stopped when the mixed waste water is continuously extracted from the circulation tank, said extracted mixed water waster being introduced through the ultrafilter device and is concentrated by removing the fluid to form concentrated waste water and the concentrated waste water is introduced into the circulation tank.

17 Claims, 6 Drawing Sheets

(51) Int. Cl.
*B01D 61/14* (2006.01)
*B24B 37/04* (2012.01)
*B24B 57/00* (2006.01)
*C02F 1/44* (2006.01)
*B01D 61/22* (2006.01)
*B01D 15/00* (2006.01)
*C02F 103/34* (2006.01)

(52) U.S. Cl.
CPC ............ *B24B 37/042* (2013.01); *B24B 57/00* (2013.01); *C02F 1/444* (2013.01); *B01D 2315/16* (2013.01); *B01D 2315/18* (2013.01); *C02F 2103/346* (2013.01); *C02F 2209/02* (2013.01); *C02F 2209/40* (2013.01)

(56) References Cited

U.S. PATENT DOCUMENTS

| | | | |
|---|---|---|---|
| 5,647,989 | A | 7/1997 | Hayashi et al. |
| 5,772,900 | A | 6/1998 | Yorita et al. |
| 6,077,437 | A | 6/2000 | Hayashi et al. |
| 6,106,728 | A | 8/2000 | Iida et al. |
| 6,183,352 | B1* | 2/2001 | Kurisawa ..................... 451/87 |
| 6,203,705 | B1* | 3/2001 | James et al. ................. 210/638 |
| 6,402,599 | B1* | 6/2002 | Crevasse et al. ............ 451/87 |
| 6,506,306 | B1 | 1/2003 | Hammer et al. |
| 6,722,958 | B2 | 4/2004 | Matsumoto et al. |
| 2002/0052064 | A1 | 5/2002 | Grabbe et al. |
| 2002/0168926 | A1* | 11/2002 | Matsumoto et al. ........... 451/60 |
| 2003/0189004 | A1* | 10/2003 | Chang et al. ................. 210/650 |
| 2005/0194315 | A1* | 9/2005 | Adams et al. ............... 210/636 |
| 2010/0163487 | A1 | 7/2010 | Abe et al. |

FOREIGN PATENT DOCUMENTS

| | | |
|---|---|---|
| JP | H10-118899 A | 5/1998 |
| JP | 2002-513178 A | 5/2002 |
| JP | 2002-331456 A | 11/2002 |
| JP | 2003-309091 A | 10/2003 |
| JP | 2008-034827 A | 2/2008 |
| KR | 2002-0085839 A | 11/2002 |
| RU | SU 739105 | 6/1980 |
| RU | 2199377 | 2/2003 |
| WO | 99/56189 A1 | 11/1999 |

OTHER PUBLICATIONS

Russian Office Action issued in corresponding Russian Patent Application No. 2012118990/05(028615) dated Oct. 21, 2013.
N.L. Ricker, "Ultrafilteration Nanofilteration", XP055174547, May 2005, pp. 1-9.
Kovacs et al., "Modeling of batch and semi-batch membrane filteration processes", Journal of Membrane Science 327, 2009, XP025917510, pp. 164-173, Elsevier.

\* cited by examiner

RECYCLING METHOD AND DEVICE FOR RECYCLING WASTE WATER CONTAINING SLURRY FROM A SEMI-CONDUCTOR TREATMENT PROCESS, IN PARTICULAR FROM A CHEMICO-MECHANICAL POLISHING PROCESS

CROSS REFERENCE TO RELATED APPLICATIONS

This application is a National Stage of International Application No. PCT/DE2010/075106 filed Oct. 6, 2010, claiming priority based on German Patent Application No. 10 2009 044 204.9 filed Oct. 8, 2009, the contents of all of which are incorporated herein by reference in their entirety.

The invention relates to a recycling method and a recycling device for recycling slurry wastewater from a semiconductor processing process, in particular from a chemical-mechanical polishing process.

For polishing semiconductor materials, in recent years, chemical-mechanical polishing (CMP) has established itself as the standard method. In particular, CMP is employed after the deposition of functional layers onto semiconductor wafers in order to compensate for irregularities that have resulted during deposition. In this case, a chemically and mechanically active, colloidal polishing agent, what is termed slurry, is distributed between the semiconductor wafer and a polishing surface. Supported by relative motions between semiconductor wafer and polishing surface, the semiconductor wafer surface is chemically attacked and polished.

In such polishing processes, fresh slurry must be continuously fed to the polishing surface in order to achieve an optimum polishing performance. In the polishing process, wastewater is formed which, in addition to polishing liquid (generally water and slurry), contains impurities which result from the polishing abrasion. In addition, the wastewater generally contains additional chemicals which control the polishing process. These can comprise, depending on the process type, pH regulators, oxidizing agents and/or stabilizers. The slurry wastewater is generally removed and disposed of. Since not only the slurry but also the polishing liquid are costly to acquire, slurry recycling processes offer a great cost-savings potential.

In known processes for recovering slurry from the slurry wastewater, the wastewater removed from a CMP device is collected and recycled by mixing and/or filtering processes. Such a method is disclosed, for example, in EP 0 822 033 A1. In this known method, the wastewater is removed from the polishing process by suction using a pump and passed into a type of mixing device, wherein further treatment substances and also fresh slurry are also introduced via linelines. The treated mixture resulting therefrom is passed as recycled slurry through a heat exchanger, a plurality of sensors and also finally a filter and fed to the polishing process as fresh slurry. Linear recycling methods of this type, in which the wastewater is fed back to the polishing process after a plurality of process steps that follow one another in time, have the disadvantage that very high requirements of the individual components of the recycling device must be made which are generally not met.

In contrast thereto, U.S. Pat. No. 6,722,958 B2 discloses the recycling of slurry in a cycle method. In accordance therewith, wastewater from a CMP process is charged into a vessel and from there passed through an ultrafilter. In this case, water filtered out from the wastewater is disposed of. The filter product resulting during filtering is passed as concentrated slurry back into the vessel. Then, or simultaneously, a purification process is carried out, in which purification water is regularly introduced into the vessel in order to dilute and wash the concentrated slurry in order in this manner to extract by dissolution impurities such as salts and organic substances. However, this method is complex and in addition does not fulfill the purpose of obtaining in an efficient manner a high concentration of recycled slurry.

It is therefore the object of the invention to provide a recycling method and a recycling device for a cost- and time-efficient recycling of slurry and/or further fluids such as water, for example, from slurry wastewater.

The object is achieved according to the invention by a recycling method having the features of claim 1 and by a recycling device having the features of claim 12. Advantageous developments of the invention are specified in the subclaims.

The invention is firstly based on the principle of concentrating the slurry-containing wastewater that is to be recycled by fluid removal in a circulation or circuit. For this purpose the wastewater is first passed into a circulation vessel. There it mixes with concentrated wastewater generated in the circuit to form mixed wastewater. In the circulation process, mixed wastewater is removed from the circulation vessel, passed through an ultrafilter device and concentrated wastewater formed in this process is passed back into the circulation vessel.

The ultrafilter device therefore comprises at least one entry through which the mixed wastewater that is removed from the circulation vessel is introduced into the ultrafilter device, and at least two exits. In the ultrafilter device, liquid is removed from the mixed wastewater that is introduced, in order thus to achieve a concentration of the wastewater. The concentrated wastewater is then passed through one of the exits of the ultrafilter device and via a wastewater return line into the circulation vessel. The liquid that is removed from the mixed wastewater is ejected via a second exit of the ultrafilter device and can then preferably be collected and reused.

The recycling method comprises in this case substantially two process phases, namely a first phase in which the filtration step is carried out, and a second phase in which the concentration step is carried out. In the filtration step, while the wastewater is concentrated in the circuit between the circulation vessel and the ultrafilter device, fresh slurry wastewater is passed into the circulation vessel, which slurry wastewater mixes with the concentrated wastewater.

In contrast, the concentration step is distinguished in that, during the concentration of the wastewater in the circuit, the feed of fresh slurry wastewater into the circulation vessel is decreased or substantially shut off. A switchover between the first phase and the second phase proceeds using a control device of the recycling device. The switchover operation can be, for example, controlled with respect to time, or triggered. Preferably, however, it is controlled on the basis of measurements which are determined using sensors arranged in the recycling device and comparison thereof with theoretical values.

The expression "fresh wastewater" means that in this case this is wastewater which is introduced by passing it into the circulation vessel of the previously described circuit for concentrating the wastewater. This fresh wastewater therefore differs from the concentrated wastewater which is passed from the exit of the ultrafilter device to the circulation vessel. The fresh wastewater is the slurry-containing wastewater which is produced in the semiconductor processing, for example in the chemical-mechanical polishing process (CMP process) and comprises slurry contaminated by eroded material and other chemicals.

The fresh wastewater can also be prefiltered wastewater which, for example, is first stored in a preliminary storage tank and is passed from there via one or more prefilter stages to the circulation vessel. Preferably, prefiltration proceeds in a two-stage manner and with very small retention rates in such a manner that particulate contaminations, for example owing to pad wear in a CMP process, are kept away from the circulation vessel. By this means a rapid blocking of the ultrafilter device is prevented. This is of great importance, in particular in membrane-based ultrafilter devices having hollow-fiber membranes.

The ultrafilter device is a filter device which is suitable for taking off liquid from the mixed wastewater introduced herein and flowing through it. Generally, this liquid is water, but other liquids or liquid mixtures can also be removed from the mixed wastewater which will possibly be used in the semiconductor processing process. In the ultrafilter device it is ensured that particles which are located in the liquid removed from the mixed wastewater have particle sizes of at most about 0.01 µm to about 0.1 µm. This is in contrast, for example, to microfiltration in which the liquid that is removed can have particles in the order of magnitude of above 0.1 µm. In other words, in this case the expression "ultra" in the expression "ultrafilter device" is used to characterize the particle size separated off from the mixed water together with the liquid by the filter device.

On passage through the ultrafilter device, the mixed wastewater is concentrated to give a concentrated wastewater. This means that the slurry in the concentrated wastewater is present in a higher volume concentration than in the mixed wastewater which was introduced into the ultrafilter device. The concentration proceeds by fluid removal in the ultrafilter device and leads to an increase in the solids concentration in the concentrated wastewater compared with the mixed wastewater.

In a preferred embodiment, it is provided that the mixed wastewater that is removed from the circulation vessel is passed through a membrane-based ultrafilter device and concentrated thereby by removal of a permeate to give concentrated wastewater. In particular, this can be in this case a cross-flow filtration device, also called tangential-flow or cross-current filtration. The membrane of the ultrafilter device is preferably made of a polymer, for example of polyacrylonitrile.

In an advantageous development it is provided that the concentration step is carried out immediately after the filtration step. This means that no further process steps are carried out in time between the concentration step and the filtration step. While the mixed wastewater in the filtration step is removed from the circulation vessel and then passed through the ultrafilter device and back into the circulation vessel, the feed of the fresh wastewater into the circulation vessel, controlled by the control device, is decreased or preferably completely shut off, in order to initiate the concentration step.

According to an expedient embodiment, it is provided that the concentration step is introduced when a solids concentration in the circulation vessel exceeds a predetermined low-concentration threshold value. In other words, the introduction of fresh slurry wastewater into the circulation vessel is stopped as soon as the low-concentration threshold value is reached which has a value of between about 1% and 3%, preferably a value of about 2%. The solids concentration is measured in the circulation vessel and/or in a mixed wastewater removal line, for example using an optical online analysis device.

Preferably, it is provided that the concentration step comprises a continuous addition of an agglomeration inhibitor to the mixed wastewater removed from the circulation vessel. The agglomeration inhibitor used is preferably a lye. It serves for stabilizing the colloidal slurry in order to maintain a distance as high as possible from what is termed the isoelectric point (IEP). Preferably, a lye is used which was also present in the original slurry, that is to say during use of the slurry in the semiconductor processing. An example of an effective agglomeration inhibitor is ammonia ($NH_3$).

It must be noted here that as little lye as possible should pass into the permeate in order to reduce the costs for the lye and in addition avoid contamination of the permeate. In the present recycling method this is achieved by the agglomeration inhibitor being added only over a very short time, namely in the course of the concentration step, during which the feed of fresh wastewater to the circulation vessel is stopped. Lines used for the inflow of the agglomeration inhibitor can be formed of plastic and preferably comprise perfluoroalkoxyalkane.

In an expedient embodiment it is provided that during passage through the ultrafilter device, liquid removed from the mixed wastewater is introduced into a liquid vessel and from there is fed to the semiconductor processing process. Before the introduction into the liquid vessel and/or before being passed onto the semiconductor processing process, the liquid can be subjected to further treatments, for example further filter or purification steps. If a membrane-based ultrafilter device is used, the liquid that is removed can be termed permeate and the storage device therefore termed permeate vessel.

In an advantageous embodiment it is provided that a ratio between a concentration time period during which the concentration step is carried out and a filtration time period during which the filtration step is carried out is less than about 5%, preferably less than about 3%. In other words, the recycling device spends about 97% of the total process duration, considered in terms of time, in a filtration phase during which the filtration step is carried out, and only about 3% of the total process time in a concentration phase during which the concentration step is carried out.

According to a preferred development, it is provided that the concentration step is carried out until a solids concentration in the circulation vessel exceeds a predetermined high-concentration threshold value, whereupon, in a filling step following later in time, the mixed wastewater is removed from the circulation vessel as recycling slurry. The filling step in this case can comprise further filter steps and/or treatment steps, for example in order to separate out relatively large particles from the recycling slurry, for example particles which exceed a particle size of about 1 µm.

More advantageously it is provided that the wastewater, the mixed wastewater, the concentrated wastewater, the liquid removed from the mixed wastewater by the ultrafilter device and/or the recycling slurry are conducted and/or stored substantially metal-free. In other words, the lines and vessels used therefor have metal-free inner surfaces which are preferably completely formed of plastic. Preferably, this applies to all of the lines, vessels and/or pumps used in the recycling device. A metal-free conducting and/or storage of the differing wastewaters and liquids has the advantage that no metallic impurities pass into the wastewaters. The restriction to a "substantially" metal-free conduction or storage means that inner surfaces of the respective components or the respective components in their entirety are produced in such a manner that they have metallic substances only as necessitated by production, and only in traces.

According to a preferred embodiment, it is provided that the mixed wastewater is blanketed with inert gas in the circulation vessel. In other words, the inert gas is introduced into the circulation vessel, above a mixed wastewater filling level, in such a manner that an inert gas layer forms there. Alternatively, the circulation vessel can be charged with inert gas above the filling level. The inert gas is preferably moistened. The blanketing with inert gas, in particular with moist inert gas, has the advantage that drying or crust formation of the mixed wastewater on inner walls of the circulation vessel is prevented. Preferably, therefore, all other vessels and tanks in the recycling device are charged with moist inert gas. Lines used for the inflow of the inert gas can be formed of plastic and preferably comprise perfluoroalkoxyalkane. The inert gas can be, for example, nitrogen ($N_2$).

In order that the differing circuits in the recycling device are as tight and leak-free as possible, some or all of the pumps used here for transporting liquids and/or gases should preferably be devoid of bearings and seals. This applies not only to pumps for transporting the fresh wastewater, the wastewater, the mixed wastewater and/or the concentrated wastewater, but also to pumps which are used for transporting the agglomeration inhibitor and also the inert gas.

Preferably, regularly introduced backwash steps are provided in which, on passage through the ultrafilter device, liquid removed from the wastewater is passed in the reverse direction through the ultrafilter device for detaching filter membrane accretions. Such filter membrane accretions can, as what is termed a filter cake, impair the effective functioning of the filter device. The backwash steps can be carried out at fixed, equidistant time intervals. Alternatively, or in addition, backwash steps can be triggered by a measured value which indicates the degree of fouling of the membrane, for example by a flow resistance.

In order to make the method cost effective, care must be taken to ensure an effective backwashing. In particular, it is advantageous for the backwashing to use a gas in addition to or alternatively to the liquid removed from the wastewater. Preferably, inert gas, for example nitrogen, or a mixture of inert gas and liquid, is used for the backwashing. The liquid, the gas or the mixture is preferably forced through the hollow fibers in order to shear off the filter cake formed at the filter membrane. The backwash wastewater resulting from the backwashing is preferably not fed back to the circuit.

The invention will be described hereinafter on the basis of working examples, with reference to the figures. In the figures.

Figure 1:
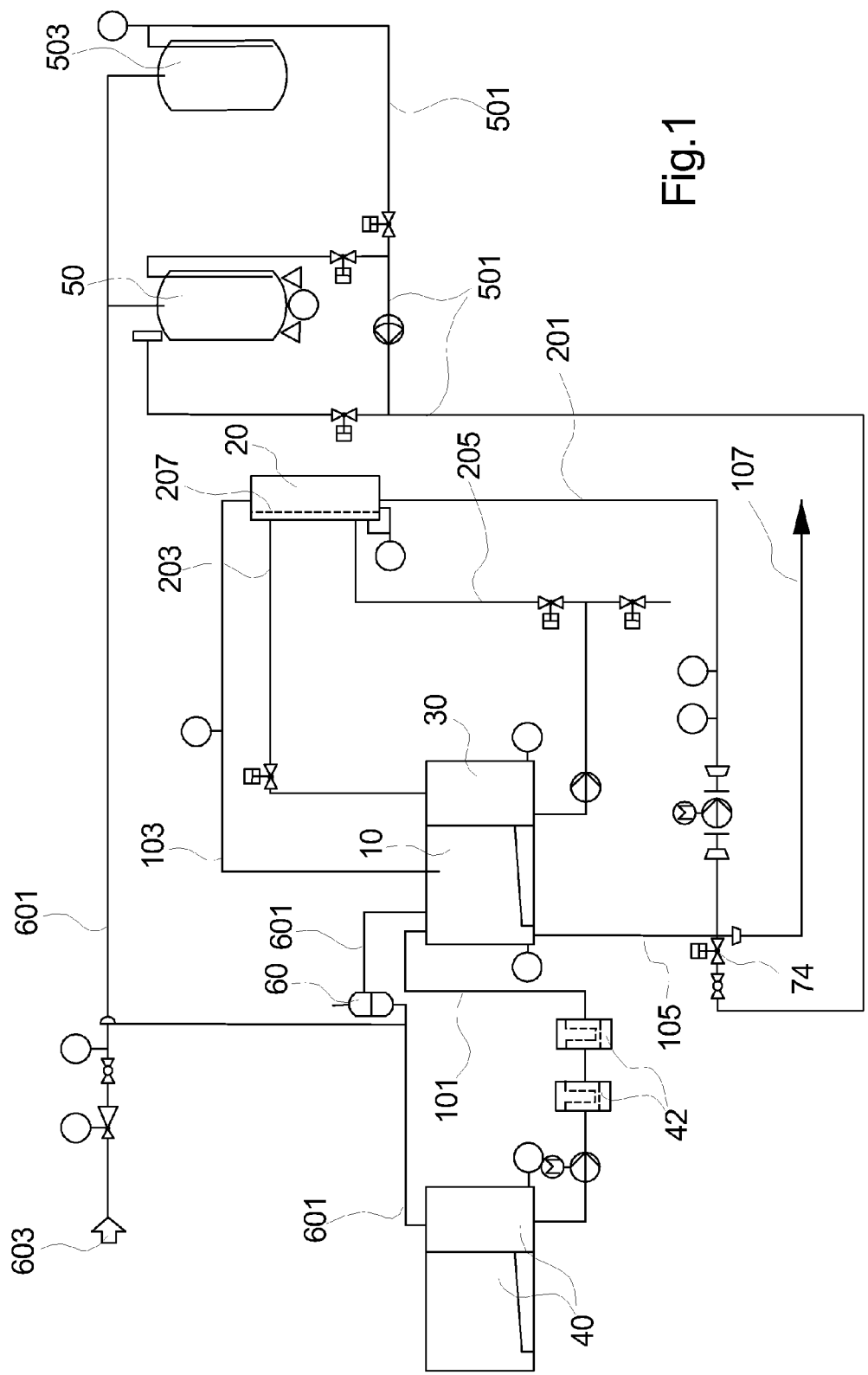
FIG. 1 shows a diagram of a recycling device for slurry wastewater.

FIG. 1 shows a diagram having the schematic makeup of a recycling device for slurry wastewater. Central components of the recycling device form a circulation vessel 10 and an ultrafilter device 20. The circulation vessel 10 and the ultrafilter device 20, together with a mixed wastewater removal line 105, an ultrafilter feed line 201 and a wastewater return line 103, form a circuit for concentrating the wastewater previously passed into the circulation vessel 10. The circulation vessel 10 has in the present case a capacity of about 500 liters.

On passage through the ultrafilter device 20, liquid is removed from the mixed wastewater, this liquid being situated in a liquid circuit comprising a liquid vessel 30, a fluid removal line 203 and a backwash line 205, wherein the latter, however, is only used at intervals. The ultrafilter device 20 in the present embodiment is a membrane filter having a membrane 207, preferably a polymer membrane, for example made of inexpensive and durable polyacrylonitrile. The liquid removed from the mixed wastewater is therefore a permeate. The liquid vessel 30 is therefore also termed hereinafter a permeate tank 30. The permeate tank 30, in the present example, has a capacity of about 200 liters.

Furthermore, in FIG. 1, reservoir tanks 40 are shown in which the slurry-containing wastewater is stored before it passes via prefilters 42 along a wastewater feed line 101 into the circulation vessel 10.

Via an $N_2$ feed 603, the recycling device is supplied with nitrogen which is moistened by means of an $N_2$ humidifier 60, and via $N_2$ lines 501 is fed to the reservoir tanks 40, the circulation vessel 10 and to the $NH_3$ vessels 50, 503. In the reservoir tank 40 and the circulation vessel 10 such a moist $N_2$ blanketing prevents crust formation of dry slurry on tank walls or vessel walls. Otherwise there would be the risk that dry slurry particles could pass back into the recycled slurry and later cause serious scratches on the semiconductor substrates processed in the semiconductor processing process. Slurry that has been dried once cannot be stabilized again.

The components of the recycling device cited here, and further components thereof, are explained in more detail hereinafter with reference to individual steps of the recycling method. In the associated FIG. 2 to FIG. 5, the most important active lines, that is to say those through which flow passes, of the recycling device are represented using broad lines and are therefore emphasized against the remaining lines. Furthermore, FIGS. 2 to 5 show the same features of the recycling device as FIG. 1.

Figure 2:
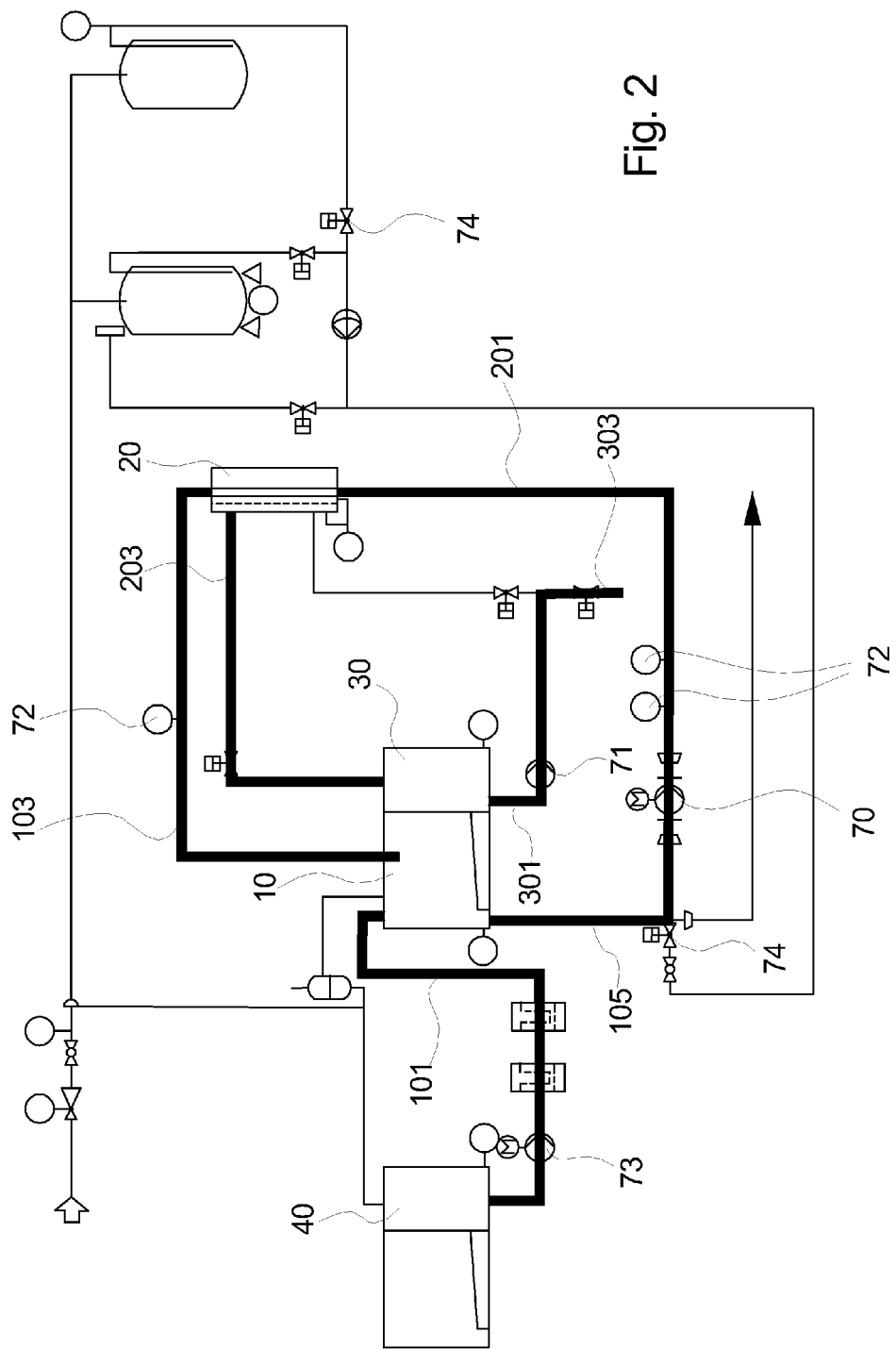
FIG. 2 shows the implementation of a filtration step on the basis of the diagram from FIG. 1.

FIG. 2 illustrates the implementation of a filtration step on the basis of the diagram of FIG. 1. Using a fresh wastewater pump 73, fresh wastewater stored in one of the reservoir tanks 40 is introduced via the wastewater feed line 101 into the circulation vessel 10. The feed of fresh wastewater proceeds continuously, while mixed wastewater is pumped by the circulation pump 70 out of the circulation vessel 10 via the mixed wastewater removal line 105 and passed via the ultra filter feed line 201 through the ultrafilter device 20. The concentrated wastewater exiting from the ultrafilter device 20 is passed via the wastewater return line 103 back into the circulation vessel 10.

During passage through the ultrafilter device 20, liquid or permeate is removed from the wastewater, and is passed via the fluid removal line 203 into the permeate tank 30. The permeate can then, using a pump 71, be removed from the permeate tank 30 via the liquid vessel exit 301 and made available via the liquid use line 303 to a user. For example, the permeate can be returned to a semiconductor processing device. For this purpose it can be necessary first to subject the permeate to further treatment steps. Preferably, however, the permeate is removed from the liquid use line 303 and, without additional treatment, in particular without further filtering, fed to the semiconductor processing process, from which the fresh wastewater originates, for example a CMP process.

Figure 3:
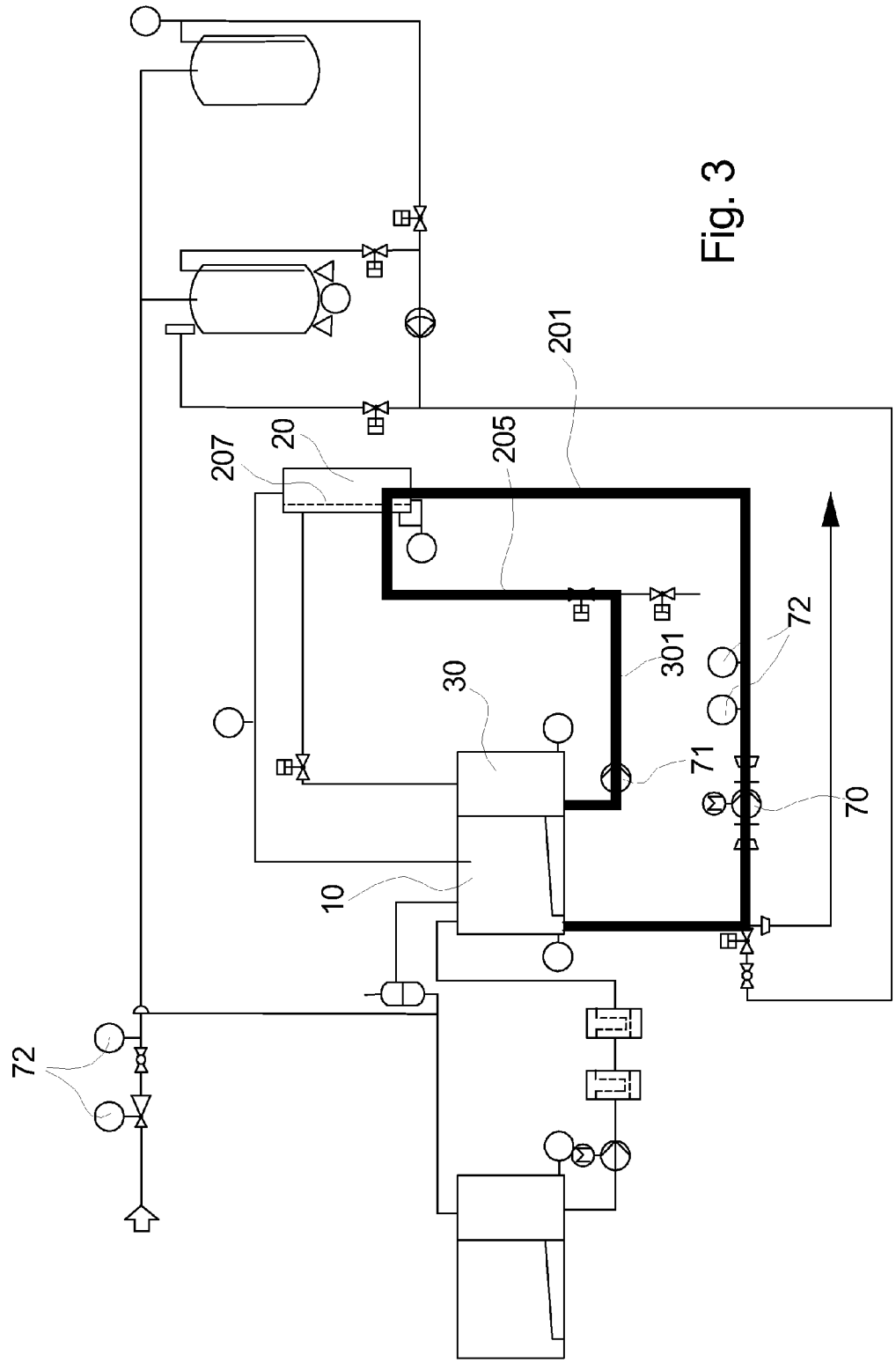
FIG. 3 shows the implementation of a backwash step on the basis of the diagram of FIG. 1.

The filter activity in the ultrafilter device 20 is performed by a membrane 207 which is permeable to the permeate. In order to avoid a filter cake forming on the membrane 207 from the filter accretions, the membrane 207 must be cleaned at regular time intervals. FIG. 3 illustrates, on the basis of the diagram of FIG. 1, the implementation of such a backwash step for cleaning the membrane 207. For this purpose, the permeate removed from the permeate tank 30 using the permeate pump 71 via the liquid vessel exit 301 is forced via the backwash line 205 in the reverse direction through the membrane 207 in order to detach and flush out any accretions which have accumulated there. The permeate which is contaminated with the accretions is conducted via the ultrafilter feed line 201 into the circulation vessel 10.

Figure 4:
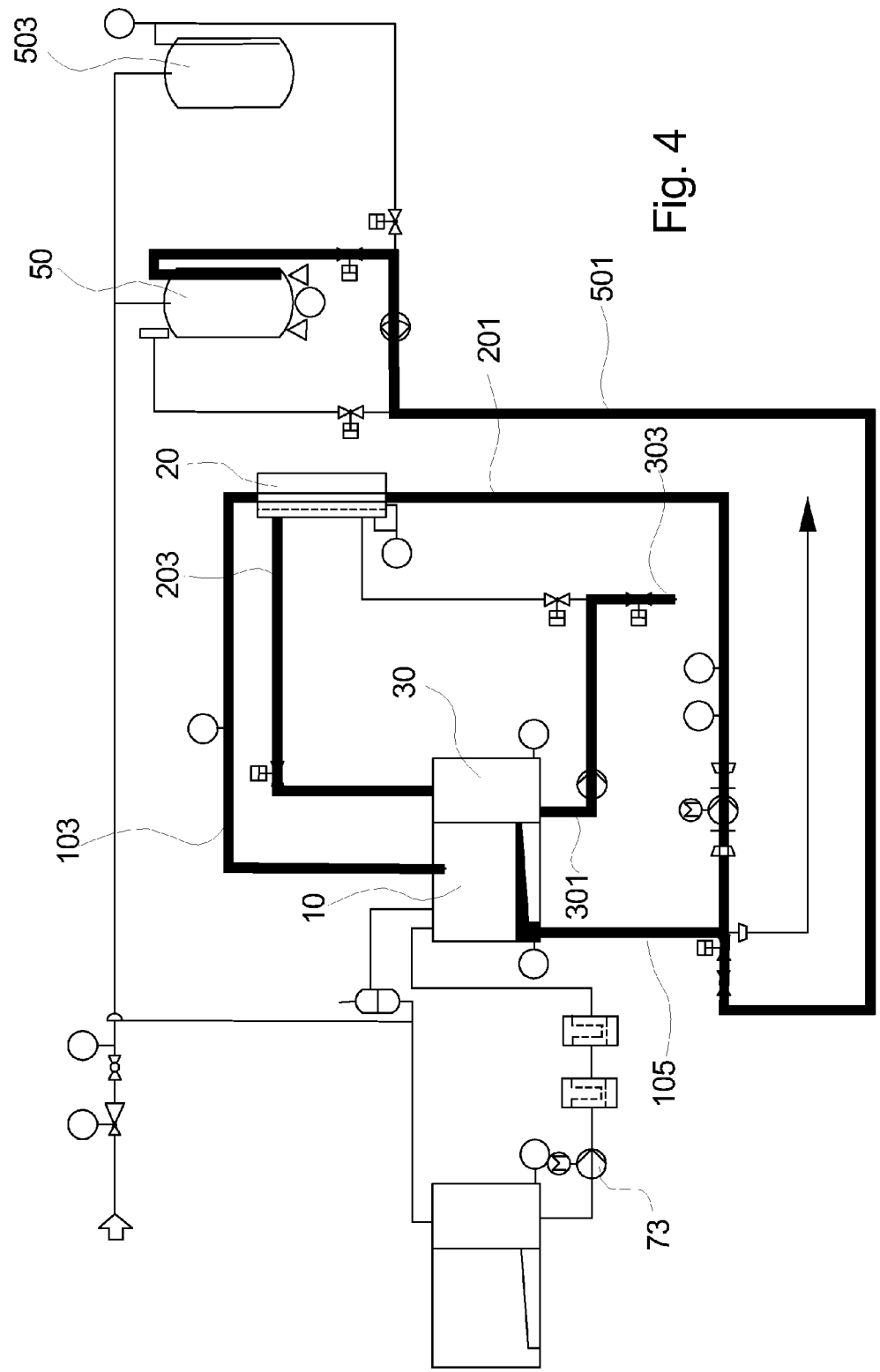
FIG. 4 shows the implementation of a concentration step on the basis of the diagram of FIG. 1.

FIG. 4 illustrates the implementation of a concentration step on the basis of the diagram of FIG. 1. The circuit of the wastewater which is described hereinbefore in connection with FIG. 2 between the circulation vessel 10 and the ultrafilter device 20 is, furthermore, substantially maintained also during the concentration step. Therefore, in addition, mixed wastewater is removed from the circulation vessel 10 via the mixed wastewater removal line 105 and passed via the ultrafilter feed line 201 through the ultrafilter device 20. From there, concentrated wastewater is passed via the wastewater return line 103 into the circulation vessel 10. The permeate removed from the mixed wastewater in the ultrafilter device 20 is passed via the fluid removal line 203 into the permeate tank 30, and from there is provided via the liquid vessel exit 301 and the liquid use line 303 for further use.

However, in contrast to the filtration step, fresh wastewater is not passed into the circulation vessel 10. The fresh wastewater pump 73 therefore remains inactive in this phase of the recycling method. Instead, however, ammonia ($NH_3$) from the $NH_3$ vessel 50, via one of the $NH_3$ lines 601, is added to the mixed wastewater in the mixed wastewater removal line 105. If the $NH_3$ vessel 50 is exhausted, an $NH_3$ reservoir vessel 503 ensures the supply with $NH_3$. Ammonia acts as agglomeration inhibitor and prevents clumping of the solids in the mixed wastewater, the solids concentration of which in the concentration step increases rapidly owing to the absence of the fresh slurry wastewater.

Figure 5:
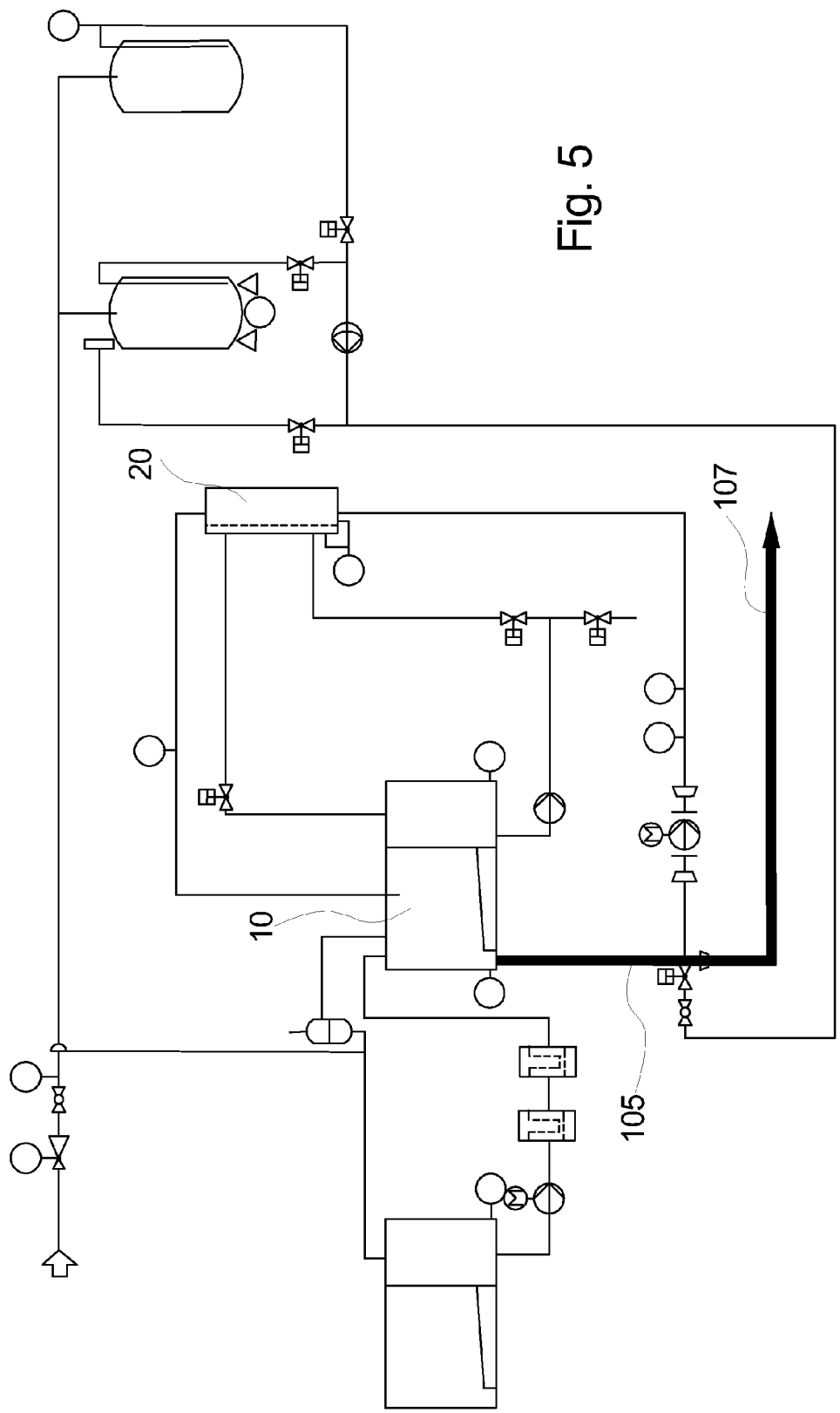
FIG. 5 shows the implementation of a filling step on the basis of the diagram of FIG. 1.

FIG. 5 illustrates the implementation of a filling step, likewise on the basis of the diagram of FIG. 2. This step is initiated after the mixed wastewater in the circulation vessel 10 has been concentrated by the concentration step in such a manner that the solids concentration thereof exceeds a predetermined high-concentration threshold value. The recycling device is monitored by a plurality of measuring instruments 72 which can comprise flow sensors, temperature sensors, concentration sensors, moisture sensors and the like. The solids concentration is determined on the basis of concentration measuring instruments and is compared in the control device (which is not shown in the figures) with the high-concentration threshold value.

Figure 6:
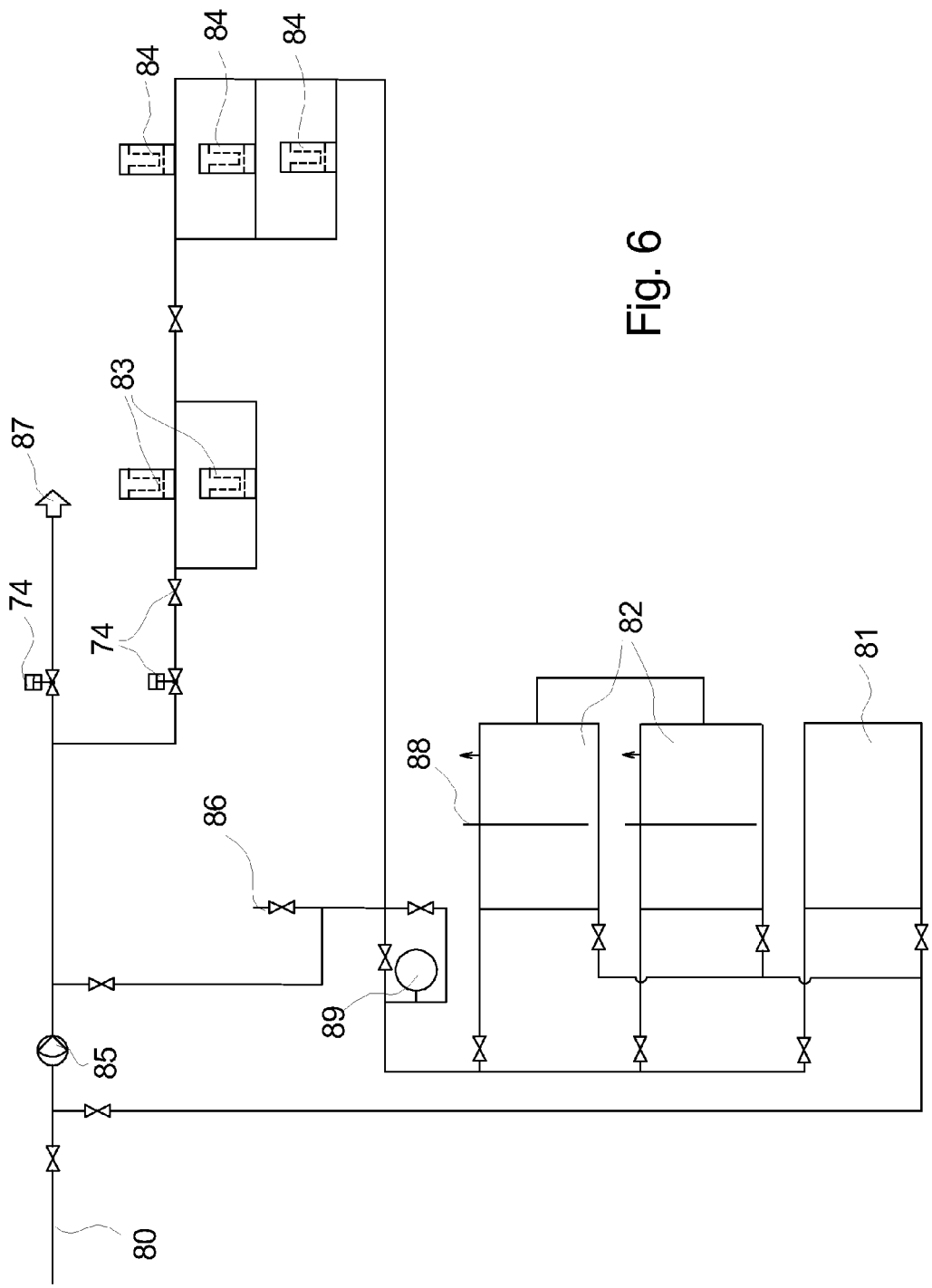
FIG. 6 shows a diagram of a slurry dispensing arrangement which is connected downstream of the recycling device.

In the diagram of FIG. 6, a slurry dispensing arrangement is schematically shown. It serves for dispensing the recycled slurry, which is taken out of the circulation vessel 10 in the filling step shown in FIG. 5 via the dispensing line 107, into recycling slurry vessels 82 provided therefor. Optionally, the recycled slurry is previously subjected to an after-treatment such as filtering via one or more filter stages, for example. In the present case, the dispensing arrangement shown in FIG. 6 comprises filters 83 of a first filter stage for removing particles having a particle size of at least 2 μm and also filters 84 of a second filter stage for removing particles having a particle size of at least 0.5 μm.

Using valves 74, the recycled slurry, after passing through the filters 83, 84, is charged into the recycling slurry vessels 82. There is also the possibility, in the case of corresponding actuation of a concentrate pump 85 and the valves 74, of passing on the recycled slurry via an exit 87 to a concentrate wastewater treatment. By appropriately actuating the valves 74, in addition, the particle size of the particles in the dispensed slurry can in addition be controlled, likewise, optionally, their particle density and composition. These parameters are controlled and monitored by means of an online analysis device 89.

The slurry dispensing arrangement shown in FIG. 6 in addition comprises a fresh slurry vessel 81 and an entry 86 for deionized water. Using fresh slurry and/or deionized water, and also optionally using further chemicals, the recycled slurry can be optimally conditioned for further use. Finally, the recycling slurry vessels 82 each have a nitrogen feed line 88 in order to charge the vessels 82 with preferably moist nitrogen.

LIST OF REFERENCE SIGNS

10 Circulation vessel
101 Wastewater feed line
103 Wastewater return line
105 Mixed wastewater removal line
107 Dispensing line
20 Ultrafilter device
201 Ultrafilter feed line
203 Fluid removal line
205 Backwash line
207 Membrane
30 Liquid vessel (permeate tank)
301 Liquid vessel exit
303 Liquid use line
40 Reservoir tanks
42 Prefilters
50 $NH_3$ vessels
501 $NH_3$ line
503 $NH_3$ reservoir vessels
$N_2$ humidifier
601 $N_2$ lines
603 $N_2$ feed
70 Circulation pump
71 Permeate pump
72 Measuring instruments
73 Fresh wastewater pump
74 Valves
81 Fresh slurry vessel
82 Recycling slurry vessel
83 Filters of first filter stage
84 Filters of second filter stage
85 Concentrate pump
86 Entry for deionized water
87 Exit for concentrate wastewater treatment
88 Nitrogen feed line
89 Online analysis device

The invention claimed is:
1. A recycling method for recycling fresh slurry-containing wastewater from a chemical-mechanical semiconductor polishing process, the recycling method comprising:

continuously feeding, in a filtration step, the fresh slurry-containing wastewater into a circulation vessel, while continuously removing mixed wastewater from the circulation vessel, continuously passing the removed mixed wastewater through an ultrafilter device which removes permeate from the mixed wastewater to obtain concentrated wastewater, and continuously passing the concentrated wastewater back into the circulation vessel to mix with the fresh slurry-containing wastewater in the circulation vessel in order to obtain the mixed wastewater;

adding, in a concentration step which follows the filtration step in time, an agglomeration inhibitor and shutting off the feed of the fresh slurry-containing wastewater into the circulation vessel, while maintaining the continuously removing the mixed wastewater from the circulation vessel, the continuously passing the removed mixed wastewater through the ultrafilter device to produce the concentrated wastewater, and the continuously passing the concentrated wastewater back into the circulation vessel; and removing, in a step which follows the concentration step in time, the mixed wastewater from the circulation vessel as recycling slurry, wherein the filtration step further comprises determining a first solids concentration in the circulation vessel, and the filtration step is performed until the first solids concentration exceeds a first-concentration threshold value, and after the first solids concentration exceeds the first-concentration threshold value, the concentration step is performed, and wherein the concentration step further comprises determining a second solids concentration in the circulation vessel, and the concentration step is performed until the second solids concentration exceeds a second-concentration threshold value, and after the second solids concentration exceeds the second-concentration threshold value, the step of removing the mixed wastewater as recycling slurry is performed.

2. The recycling method as claimed in claim 1, wherein the ultrafilter device further comprises a membrane, and the permeate is removed from the mixed wastewater to obtain the concentrated wastewater using the membrane of the ultrafilter device, the membrane being penetrable by the permeate.

3. The recycling method as claimed in claim 1, wherein the concentration step is carried out immediately after the filtration step.

4. The recycling method as claimed in claim 1, further comprising determining a solids concentration in the circulation vessel, wherein the concentration step is performed when the solids concentration exceeds a first-concentration threshold value.

5. The recycling method as claimed in claim 1, wherein the agglomeration inhibitor is added to the mixed wastewater removed from the circulation vessel.

6. The recycling method as claimed in claim 1, further comprising feeding the fluid removed from the mixed wastewater by the ultrafilter device back to the chemical-mechanical semiconductor processing process.

7. The recycling method as claimed in claim 1, wherein the concentration step is performed for a concentration time period, and the filtration step is carried out for a filtration time period, and a ratio between the concentration time period and the filtration time period is less than about 0.03.

8. The recycling method as claimed in claim 1, wherein the fresh slurry-containing wastewater, the mixed wastewater, the concentrated wastewater, the recycling slurry and/or the fluid removed from the mixed wastewater by the ultrafilter device are conducted and/or stored substantially metal-free.

9. The recycling method as claimed in claim 1, further comprising blanketing the mixed wastewater with inert gas in the circulation vessel.

10. The recycling method as claimed in claim 2, further comprising periodically suspending the concentration and filtration steps and backwashing the ultrafilter device at time intervals and/or according to a degree of accretion of the membrane by passing fluid removed from the mixed wastewater in a reverse direction through the ultrafilter device to detach accretions from the membrane of the ultrafilter.

11. The recycling method as claimed in claim 1, wherein the fresh slurry-containing wastewater, the mixed wastewater, the concentrated wastewater, and/or the fluid removed from the mixed wastewater by the ultrafilter device are conducted and/or stored substantially metal-free.

12. The recycling method as claimed in claim 1, wherein decreasing the feed of the fresh slurry-containing wastewater in the concentration step comprises shutting off the fresh slurry-containing wastewater.

13. A recycling method for recycling fresh slurry-containing wastewater from a chemical-mechanical semiconductor polishing process in which the fresh slurry-containing wastewater is fed into a circulation vessel, and mixed wastewater is continuously removed from the circulation vessel and passed through an ultrafiltration device in which fluid is removed from the mixed wastewater to obtain concentrated wastewater which is fed back into the circulation vessel, the recycling method comprising measuring a first solids concentration and a second solids concentration in the circulation vessel, and further comprising:

switching between a filtration process, in which the fresh slurry-containing wastewater is continuously fed to the circulation vessel, and a concentration process, performed later in time to the filtration process, in which the feed of the fresh slurry-containing wastewater is shut off and an agglomeration inhibitor is added, wherein the filtration process is switched to the concentration process based on the measured solids concentration and the filtration process is switched to the concentration process when the measured solids concentration exceeds a first-concentration-threshold value and the concentration process is performed until the second solids concentration exceeds the second-concentration threshold value, and after the second solids concentration exceeds the second-concentration threshold value, the process of removing the mixed wastewater as recycling slurry is performed.

14. The recycling method as claimed in claim 1, wherein the fresh slurry-containing wastewater is wastewater output from a chemico-mechanical polishing (CMP) process.

15. The recycling method as claimed in claim 13, wherein the fresh slurry-containing wastewater is wastewater output from a chemico-mechanical polishing (CMP) process.

16. The recycling method as claimed in claim 1, wherein the filtration step is 97% of the total process duration and the concentration step is 3% of the total process duration.

17. The recycling method as claimed in claim 13, wherein the filtration process is 97% of the total process duration and the concentration process is 3% of the total process duration.

* * * * *